United States Patent [19]

Hanni et al.

[11] Patent Number: 4,514,852

[45] Date of Patent: Apr. 30, 1985

[54] PROCESS FOR PROTECTED TRANSMISSION OF DIGITAL SIGNALS

[75] Inventors: Manfred Hanni, Puchheim; Josef Brusch, Unterhaching, both of Fed. Rep. of Germany

[73] Assignee: Siemens Aktiengesellschaft, Berlin & Munich, Fed. Rep. of Germany

[21] Appl. No.: 405,687

[22] Filed: Aug. 5, 1982

[30] Foreign Application Priority Data

Sep. 15, 1981 [DE] Fed. Rep. of Germany ....... 3136461

[51] Int. Cl.³ .......................... H04L 27/30; H04J 6/00
[52] U.S. Cl. ........................................ 375/1; 371/58; 371/95; 375/33; 455/38
[58] Field of Search ........................ 375/1, 2.2, 34, 38, 375/40, 58, 95, 118, 119, 10, 114, 115; 455/27, 38, 51, 69; 371/25, 32, 33, 69, 34, 35, 42, 46, 47; 370/92, 93, 107

[56] References Cited

U.S. PATENT DOCUMENTS

| 3,754,211 | 8/1973 | Rocher et al. | 371/33 |
|---|---|---|---|
| 4,074,230 | 2/1978 | Icenbice, Jr. | 375/40 X |
| 4,222,115 | 9/1980 | Cooper et al. | 375/1 |
| 4,242,755 | 12/1980 | Gauzan | 375/95 X |
| 4,280,224 | 7/1981 | Chethik | 375/95 X |
| 4,346,475 | 8/1982 | Alexis | 375/1 |
| 4,383,323 | 5/1983 | Timor | 375/1 |

OTHER PUBLICATIONS

Telegraph and Data Transmission Over Shortwave Radio Links, 1981, pp. 101-110 and 178-182.
Elhakeem et al., "New Code Acquisition Techniques in Spread-Spectrum Communication", IEEE Trans. on Comm., vol. Com-28, No. 2, Feb. 1980, pp. 249-257.
Chow et al., "A Spread Spectrum Modem for Reliable Data Transmission in the High Frequency Band", Second Conference on HF Communication Systems and Techniques, London, England, Feb. 15-17, 1982, pp. 125-130.

*Primary Examiner*—Benedict V. Safourek
*Attorney, Agent, or Firm*—Hill, Van Santen, Steadman & Simpson

[57] ABSTRACT

In order to achieve a higher resistance to interference with respect to alien sources of deliberate interference in the use of communication connections via short waves, certain cooperative measures are proposed which include that the stations are equipped with highly-constant quartz crystal clocks and the bursts of information to be transmitted are accompanied by a time signal with the aid of which it is possible to correct any time tolerances between the stations. With an acknowledgment signal, use is made of a frequency variation of the radio frequency in the timing of consecutive burst transmissions including the acknowledgment response. The information contained in a burst in a fault safeguarded fashion is transmitted in coded form. The code sequence for encoding the information component and the fault safeguarding component of a burst and for the frequency address which determines the transmitting and receiving frequencies is recalculated for each burst on the basis of the clock time of the quartz crystal clock and on the basis of a subscriber number.

6 Claims, 6 Drawing Figures

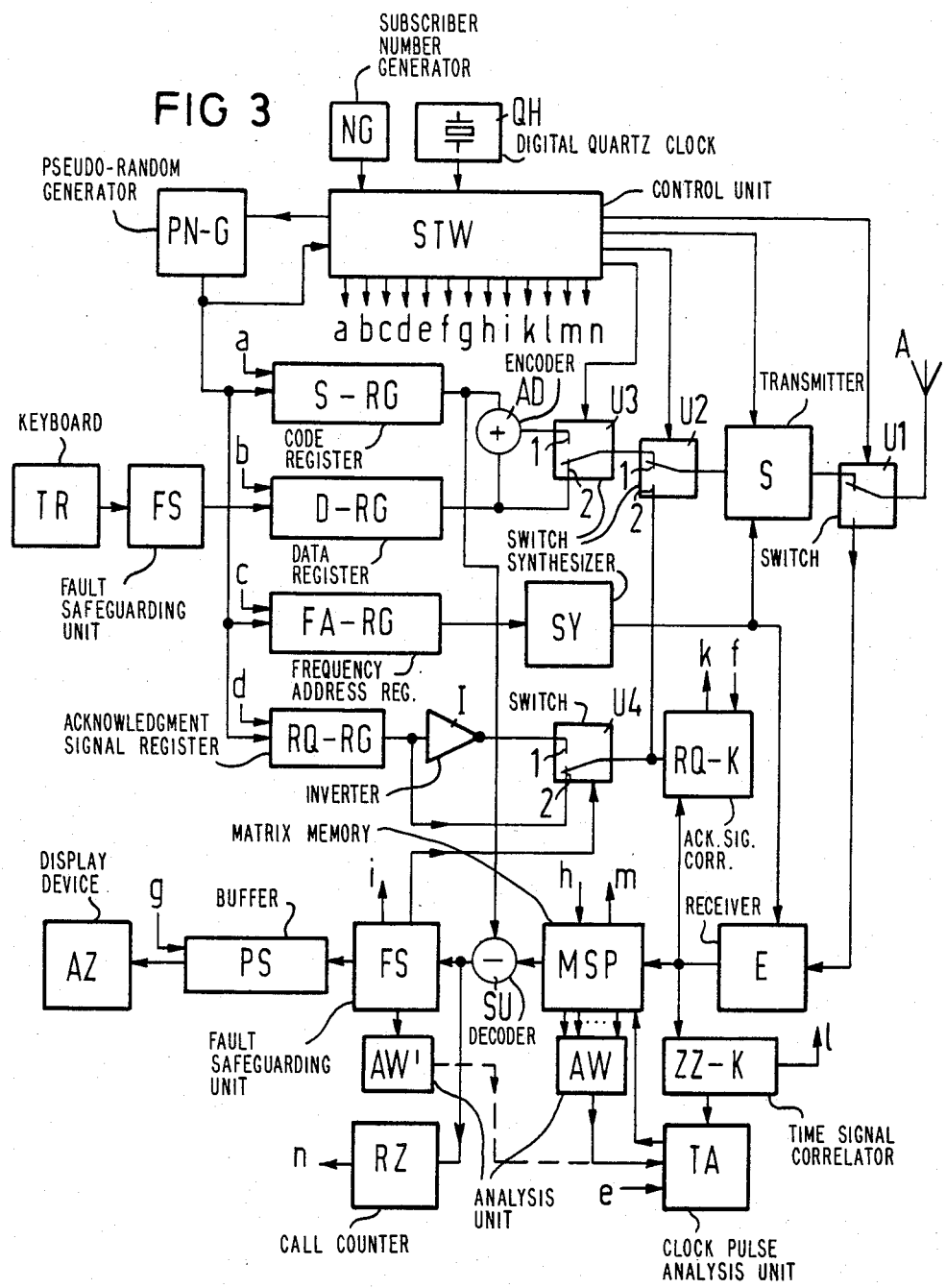

PROCESS FOR PROTECTED TRANSMISSION OF DIGITAL SIGNALS

BACKGROUND OF THE INVENTION

1. Field of the Invention

The present invention relates to a process for safeguarding transmission of digital signals, in particular items of data, across short waves wherein the encoded signals provided with data protection are transmitted block-wise (burst) from a transmitting station to a receiving station and, prior to the transmission of a further burst, the receiving station returns an acknowledgment signal to the transmitting station (automatic request).

2. Description of the Prior Art

Processes of the general type set forth above are described, for example, in the book by L. Wiesner entitled "Fernschreib- und Datenübertragung über Kurzwelle", 3rd Edition, 1980, pp. 105–114, at 184–188. The burst transmission accompanied by acknowledgment thereof, in combination with data protection, permits slightly disturbed bursts to be freed of transmission errors with regard to information content at the receiving end. Moreover, the same block can be retransmitted as and when required, if it is recognized on the basis of the response in the transmitting station that the information block has arrived in a faulty condition in a non-correctable manner at the receiving end. The encoding further permits interception-resistant transmission.

This form of protective transmission is no longer sufficient, however, when deliberate interference must be dealt with. On the other hand, deliberate interference must always be expected in radio systems used for tactical purposes. Although such radio systems generally employ a considerably higher frequency range than the short wave range, in practice it is often unavoidable to use a short wave range for reasons of unfavorable land conditions or range conditions. Therefore, in such cases it is necessary to take special measures to safeguard the communications transmission in this range.

In order to achieve reliable short wave transmission by a simple technique, the data rate is limited to approximately 200 bit/s. Three bytes corresponding to 24 bits is considered the minimum quantity of information. Taking into account the additional data protection, the minimum length for the bursts which represent the data parcels amounts to >200 ms. If the source of interference is aware of the frequency of the connection, the burst length is too high in consideration of forthcoming technology. In addition, the mutual, relatively long lasting phasing-in procedure between two stations connected to one another prior to the actual transmission process proves uncommonly liable to interference. If an interference source is successful in interfering with the establishment of the connection by the use of deliberate measures, communications transmission becomes fundamentally impossible.

SUMMARY OF THE INVENTION

The object of the present invention is, in a digital communications transmission, in particular on short waves, to provide a transmission procedure which is not only protected against interception, but also exhibits a sufficiently high resistance to deliberate interference.

On the basis of a process for the protected transmission of digital signals, in particular data, via short waves, the above object is realized according to the present invention, in that the synchronization between two stations is carried out in association with highly accurate quartz crystal clocks arranged at the station by at least one time signal which is transmitted at the beginning of a signal transmission process, the time signal consisting of a code sequence having good auto-correlation properties and which can be analyzed at the receiving end in a time signal correlator in order to adjust the receiving end clock pulse phase. Moreover, the transmitting and receiving frequencies are pseudo-randomly modified in the framework of a predetermined frequency group in frequency jump intervals, each of which comprise the transmission of a burst and the reception of the acknowledgment signal from the remote station. In this process, the code sequence for the encoding of a burst and of the associated acknowledgment signal and for the representation of a frequency address is recalculated for each burst on the basis of the clock time of the station quartz crystal clock and the subscriber number of the station receiving the burst. In association with a satisfactory receiver-related encoding, at the receiving end the burst serves an addressing and identification function simultaneously in that the receiver accepts only a burst which has been decoded with the correct code and which has been recognized as being free of error or being correctable with respect to error.

The invention is based on the recognition that when highly accurate station quartz clocks are to be used, the time required for establishing a connection, in association with time signal transmission, can be kept very short. In addition there is an effective prevention of deliberate interference with the burst by continuous changing of the radio frequency from one burst to the next. The use of the frequency jump process does indeed mean that the frequency used cannot be reserved or preliminary checked for freedom from interference. Neither can the fading conditions be predicted. However, the simultaneous use of a frequency jump process in combination with an automatic response in the form of an acknowledgment signal (ARQ) allows the execution of a safe data transmission, albeit a slow one. In order to considerably impede the recognition of the acknowledgment signal by an active interference source, this signal is likewise transmitted only in encoded form.

If the extent of the signal information which is to be transmitted is so small that it can be transmitted in a single burst, it is less effective to precede such an individual burst by a call burst. Neither is a special call required inasmuch as the code sequence, which is scrambled in association with the set subscriber number, possesses selective call properties. Thus, the call is integrated into the burst via the encoding. Therefore, each individual burst advantageously comprises an encoded information component, a likewise encoded fault safeguarding component, and an uncoded time signal component which precedes the two latter components and which is used during the receiving and analysis in a time signal correlator to set the correct receiving phase.

If the signal information which is to be transmitted must be distributed between a plurality of consecutive bursts, it is effective that the information burst which is to be transmitted and which, in each case, consists of an encoded information component and an encoded fault safeguarding component should be preceded by a call burst which comprises a time signal and a code sequence representing the selective call and which, following the reception and recognition of the call at the receiving station is transmitted for the transmission of the acknowledgement signal in a predetermined interval of time which is related to the received time signal. The reception time in the calling station of the acknowledgment signal which serves to acknowledge the call burst serves to set a narrow time window for the reception of further acknowledgment signals in the course of the subsequent transmission of information bursts. In this way it is achieved in an extraordinarily advantageous manner that in spite of its coding, the probability of recognition of the acknowledgment signal is sufficiently high. In actual fact, the time window considerably reduces the probability that the acknowledgment signal will be simulated by noise.

Whereas in the case of the transmission of the individual bursts the accompanying time signal facilitates individual bursts correction of the receiving-end clock pulse phase, in the case of the above-mentioned transmission of an item of signal information comprising a plurality of information bursts, this does not occur. The synchronization achieved by the time signal transmitted in the call burst is unable to prevent the occurrence of phase fluctuations via transit time changes during the transmission of the information bursts which follow the call burst. Up to a change in the order of a half a bit, such transit time fluctuations can be advantageously controlled, however, in that at the receiving end, prior to the decoding, each incoming bit of an information burst is input into a matrix memory in a plurality of phases, for example 8 phases. By determining those bit phase intervals which are characterized by a minimum number of bit jump transitions, it is possible to establish the receiving end clock pulse phase for each incoming information burst for the center of such bit phase interval range, whereupon the bit phase interval assigned to this clock pulse phase is decoded and fed to the fault safeguarding unit.

A matrix memory of this kind can be used to overcome even those transit time fluctuations which exceed a half a bit in that the incoming bits of an information burst which are input in a plurality of phases are decoded having been classified in accordance with their bit phase intervals and are fed to the fault safeguarding unit. In order to determine the receiving end clock pulse phase, a bit phase interval is determined which is free of error and error-correctable and which has been assumed by the receiver to emit information.

In order to prevent an interference source from imitating time signals or any other items of signal information in the timing of the consecutive bursts, which would be equivalent to an undesired increase in the fault alarm rate, according to a further feature of the invention it is proposed that the time interval between two consecutive transmission times for the transmission of a burst be changed in a pseudo-random manner within predetermined limits with the aid of the encoding device.

BRIEF DESCRIPTION OF THE DRAWINGS

Other objects, features and advantages of the invention will be best understood from the following detailed description, taken in conjunction with the accompanying drawings, on which:

FIG. 3 is a block circuit diagram of a further transmitting-receiving station which operates in accordance with the process of the present invention;

DESCRIPTION OF THE PREFERRED EMBODIMENTS

Figure 1:
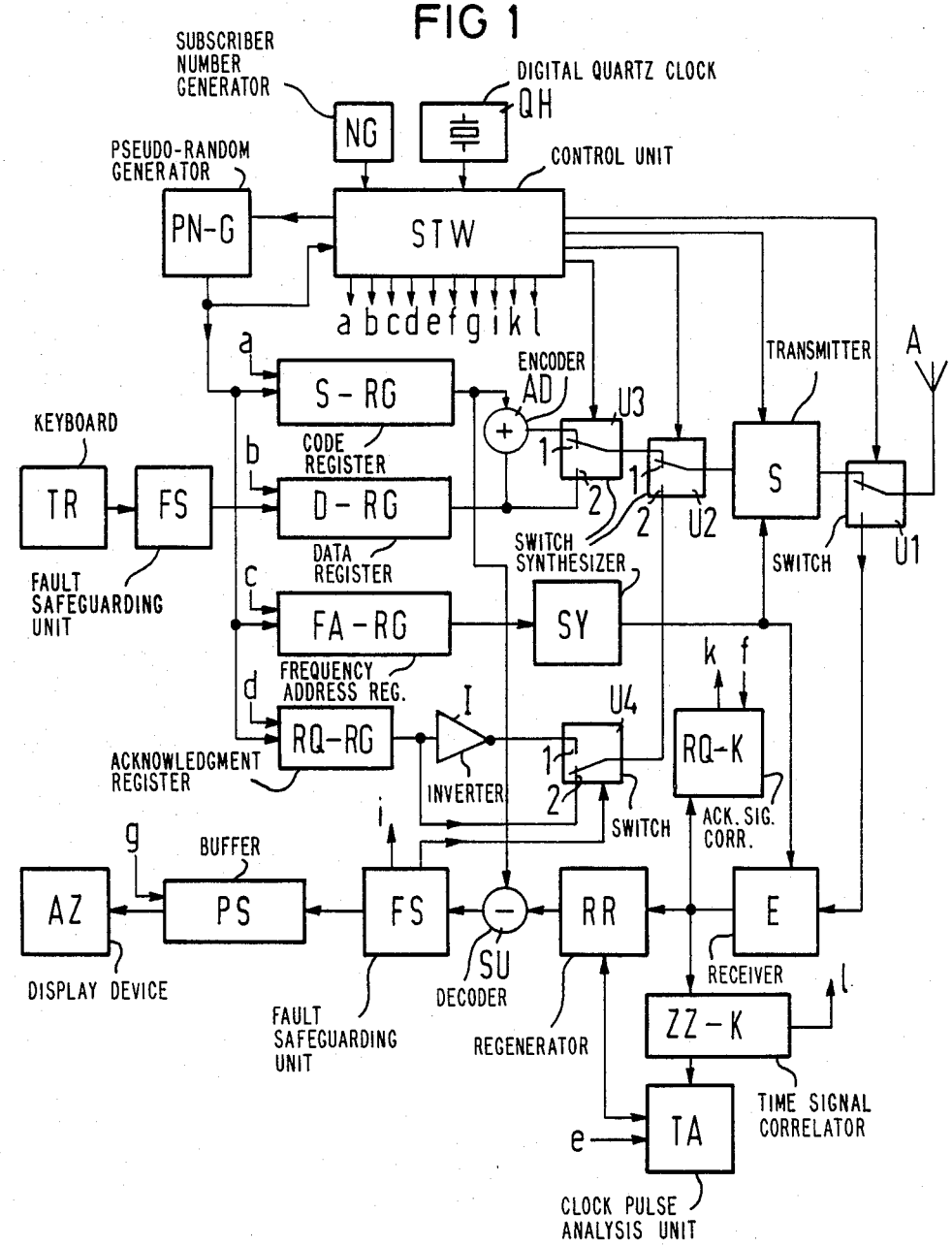
FIG. 1 is a block circuit diagram of a first transmitting-receiving station which operates in accordance with the process of the present invention.

The transmitting-receiving station illustrated in FIG. 1 for individual station operation comprises a transmitting-receiving antenna A which can be selectively connected via a transmitting-receiving transfer switch U1 to the actual transmitter S or to the actual receiver E. The transmitting-receiving station comprises, for example, a control unit STW which is represented by a microprocessor and which also cooperates with the highly accurate digital quartz clock QH and a subscriber number generator NG. The control unit STW comprises a series of clock pulse outputs a, b, c, d, e, f, and g and control information inputs i, k, and l, the connections of which to the other blocks which are yet to be described have been indicated merely by short arrows and the aforementioned reference characters. The control unit STW further cooperates with a pseudo-random generator PN-G which supplies a code sequence and which, on the one hand, makes available its output pulse sequence to the control unit STW and, on the other hand, is set by the control unit into a start position dependent upon the clock time and setting of the subscriber number generator NG via a further connection line prior to the start of a burst transmission. In other words, prior to the start of a transmitting window, a code sequence is calculated in this manner for a burst on the basis of the clock time and the subscriber number set up in the subscriber number generator NG. Because of the call selective properties of the code sequence transmitted in the form of the encoded information, this code sequence can only be decoded at the called station, which ensures that the call can be detected only by those who have set the same date code and the same subscriber number at an identical time.

Figure 2:
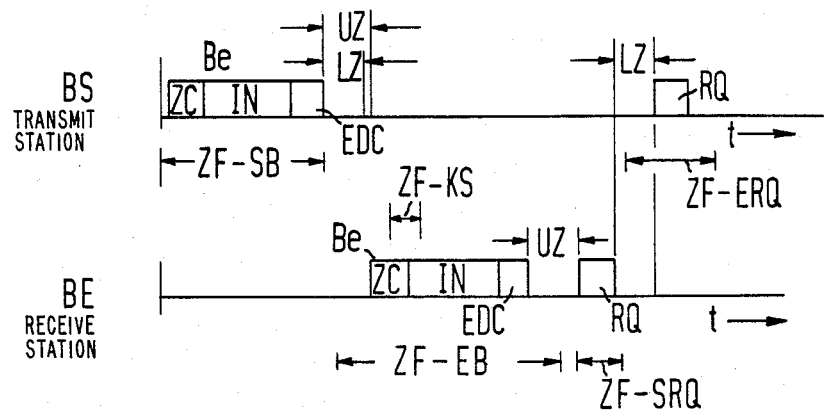
FIG. 2 is a time diagram which illustrates in detail the mode of operation of the transmitting-receiving station of FIG. 1.

Under the assumption that each burst Be illustrated in FIG. 2 must encode 36 bits in respect of its information component and fault safeguarding component IN and EDC, 36 bits are loaded from the output of the pseudo-random generator PN-G into a code register S-RG, 7 bits are loaded into an acknowledgment signal register RQ-RG, and 16–30 bits (dependent upon the application) are loaded into a frequency address register FA-RG. Across the address input of a synthesizer SY, the code component sequence which has been loaded into the frequency address register FA-RG determines the transmitting frequency in the transmitter S and the receiving frequency in the receiver E, which in this case are identical to one another. The information to be transmitted is input into a data register D-RG via a keyboard TR and fault safeguarding unit FS.

At the start of the time window appointed for the transmission of a burst Be, a time signal ZC which has been permanently connected in the start component of the data register D-RG (FIG. 2) is fed in the form of a Barker code to the transmitter S across a transfer switch U3 and a transfer switch U2. For this purpose, the control unit STW supplies the requisite clock pulses and operates the transfer switch U3 into the switching position 2. Then the transfer switch U3 is returned to the switching position 1 represented in FIG. 1 and, in addition, the code register S-RG is supplied with control clock pulses. As a result, the actual information together with the adjoining fault safeguarding component, is coded in an encoder AD and likewise fed to the transmitter S via the two transfer switches U3 and U2.

The transmitting station and the remote receiving station are long-term synchronized, synchronization being maintained by the highly accurate station quartz crystal clocks QH. Possible phase errors are corrected at the receiving end by the arrival of the time signals.

When a burst arrives at the transmitting-receiving antenna A, the transmitting-receiving transfer switch U1 is in the position opposite that illustrated in which the signal is fed to the receiver E. Across its output, the receiver feeds the time signal representing the start of the burst to a time signal correlator ZZ-K which, for the duration of the time windows which has been provided for this purpose at the receiving end and which is referenced ZF-KS in FIG. 2, observes the formation of the time signal correlation peak on its establishment, via a clock pulse analysis unit TA, provides that the following 36 bits with the clock pulse phase determined via the correlation process are regenerated in a regenerator RR connected to the output of the receiver E and are subsequently decoded in a decoder SU. For this purpose, the code signal stored in the code shift register S-RG is fed to the second input of the decoder. The fault safeguarding unit FS which is connected to the output of the decoder SU feeds the information, where it has established the freedom from faults thereof or where it can correct an existing error, to a buffer PS across which the information is then represented on a display device AZ.

Immediately following the processing of the last information bit, the transmitting-receiving station which receives the burst switches from reception to transmission via the transmitting-receiving transfer switch U1 and acknowledges that the burst has been correctly received by the transmission of an acknowledgment signal stored in the acknowledgment signal register RQ-RG via the transfer switches U4 and U2 each of which occupy the switching position 2, to the transmitter S which transmits the acknowledgment signal to the remote station via the transmitting-receiving transfer switch U1 and the transmitting-receiving antenna A. If there is no recording of a correctly-received burst, the acknowledgment signal is transmitted in inverted form. For this purpose, at the receiving end the fault safeguarding unit FS operates the transfer switch U4 into the switching position 1 so that the acknowledgment signal which is output from the acknowledgment signal register RQ-RG reaches the transmitter via an inverter I.

The transmitting-receiving station which has transmitted the burst operates its transmitting-receiving transfer switch U1 into the position opposite that illustrated and thus into readiness for reception as soon as the burst is transmitted. The incoming acknowledgment signal is fed via the receiver E to the receiving end acknowledgment signal correlator RQ-K which forwards the correlation result to the control unit STW. Independently of the correlation result, the control unit STW prepares the transmission of a further burst. In the event of a positive correlation result, for this purpose the data register D-RG is previously loaded with a new item of information, whereas in the case of a negative result this does not occur. This ensures that in the event of a negative result, the further burst which is to be transmitted conforms with the preceding burst in respect of its useful signal content. The change in the transmitting frequency and the code signal which is re-scrambled for each burst on the basis of the clock time, and the transmitting time which changes pseudo-randomly within predetermined limits, are not effected by the correlation result of the acknowledgment signal correlator.

The clock pulses of the control unit STW which are available only at specific times in the registers and other assemblies responsible for this purpose, serve to automatically set the time windows required for the desired time selection in the transmitter and receiver. The transmitting end time window for the transmission of a burst is referenced ZF-SB in FIG. 2. At the input end, the burst itself comprises the time signal component ZC and the adjoining sections in the form of the information component IN and the fault safeguarding component EDC.

The upper diagram in FIG. 2, referenced BS, is assigned to the station which transmits the burst Be. Following the time window ZF-SB the station which transmits the burst is switched over, from transmission to reception during a time interval UZ. The burst which arrives in the receiving station following a transmit time LZ is provided with a time window ZF-EB which, however, is selected to be correspondingly larger than the time window ZF-SB because of the unknown transmit time.

In the station which receives the burst Be following the reception of the burst, a transfer is made from reception to transmission in the time interval UZ, whereupon the acknowledgment signal RQ is transmitted within the time window ZF-SRQ. Following another transit time LZ, the acknowledgment signal arrives in the station which originally transmitted the burst where it can be received within a time window ZF-ERQ provided for receipt of the acknowledgment signal.

In the station which receives the burst, for the recognition of a time signal correlation peak, a time window ZF-KS has also been represented which likewise substantially limits the possibility of a false alarm. The width of the time window for the time signal correlation peak ZF-KS must be selected to be such that, even taking into account the unknown transit time and maximum clock tolerance, the time signal correlation peak still lies clearly within this time window.

The block circuit diagram illustrated in FIG. 3 of a transmitting-receiving station for continuous signal operation differs from the station illustrated in the block circuit diagram of FIG. 1 only in certain details and therefore the description thereof may be limited to such details. Here, the control unit STW comprises a further clock pulse output h and two further clock signal inputs m and n. These additional terminals are needed for a matrix memory MSP which will be explained in further detail and which is provided in place of the regenerator RR illustrated in FIG. 1 and for an additional element, a call counter RZ.

The highly-accurate station quartz clocks QH ensure that even during continuous signal operation the code devices of the two stations which are to be connected to one another are sufficiently in synchronism all day long so as to enable the same to establish a connection with a so-called "rendezvous window". A window of this kind is set, for example, only every 20 seconds. When the subscriber number of the desired subscriber is set in the calling station with the aid of the subscriber number generator NG, the emission of a call burst Br (FIG. 4) which represents a selective call and comprises a time signal ZC representing a Barker code and a code sequence SF is transmitted at a frequency at which the receiving station receives the call burst. The call signal, and likewise the time signal which represents a barker code are permanently wired in the data register D-RG. At the beginning of a call burst, the time signal is directly fed, in uncoded form, to the transmitter S via the transfer switch U3 in the switching position 2 and via the transfer switch U2 in the switching position 1. The transfer switch U3 is then operated into the switching position 1 and at the same time the call signal, composed for example of 36 logic "1's", in the data register D-RG and the code sequence in the code register S-RG are fed to the encoder AD. The encoded call signal is likewise fed via the transfer switch U3 and the transfer switch U2 to the transmitter S which transmits the total call burst via the transmitting-receiving transfer switch U1 and the antenna A.

The call burst BR which arrives at the remote station is fed via the transmitting-receiving transfer switch U1, when the switching arm thereof occupies the switching position opposite that illustrated to the receiver E which is connected at the output end to the time signal correlator ZZ-K. In order to correct the receiving end clock pulse phase, the time signal correlation P which marks the recognition of the time signal is fed to the clock pulse analysis unit TA which supplies the matrix memory MSP with the clock pulse in the corrective clock pulse phase and in this manner causes the matrix memory MSP to feed the call signal which follows the time signal directly to the decoder SU. The decoder SU decodes the time signal on the basis of the code sequence with which it is supplied from the code register S-RG and feeds the code sequence to the call counter RZ. If, of the possible 36 logic "1's" the call counter RZ counts at least 32 "1's", it reports this fact via the control signal input n to the control unit STW. The function of the control unit STW, itself, is to ensure that, at a precisely-defined interval of time from the time signal correlation peak which occurs in the time signal correlator ZZ-K, the acknowledgment signal is fed from the acknowledgment signal register RQ-RG via the transfer switch U4 and the transfer switch U2 in the switching position 2 to the transmitter S, and is transmitted via the transmitting-receiving transfer switch U1 and the antenna A.

This predetermined interval of time between the receiving end occurrence of the time signal correlation peak and the transmission of the acknowledgment signal RQ allows the station transmitting the call burst to establish the radio transmit time and, on the basis of this knowledge, to now set a precise time window for the reception of the acknowledgment signal which is returned from the remote station in response to any information burst which is now transmitted.

As soon as the station which transmits the call burst has received the acknowledgment signal acknowledging the reception of the call in the called station, the control unit STW switches over from call to operation. Approximately every 300 ms a new code sequence is generated for a new information burst. The information burst which comprises the encoded information including the fault safeguarding component is fed via the transfer switch U3 in the switching position 1 and via the transfer switch U2 to the transmitter S by which it is emitted to the remote station by the transmitting-receiving transfer switch U1 and the antenna A. At the remote station A, the information burst is again fed via the transmitting-receiving transfer switch U1, with the switching arm opposite that illustrated to the receiver E which forwards the information burst from its output to the aforementioned matrix memory MSP. In the matrix memory MSP all the incoming information bits are stored in a matrix in, for example, 8 phases. The consecutive bit phase interval in which the smallest number of bit jump transitions occurs is then established via the analysis unit AW, and this interval, or these transitions, respectively, is then reported to the clock pulse analysis unit TA in order to establish the receiving and clock pulse phase. The information burst stored for a bit phase interval of the matrix memory MSP, characterized in this manner, is now further processed in the manner which has already been described above in association with the station circuit illustrated in FIG. 1.

As already mentioned above, in this manner the use of the matrix memory allows the compensation of transit time fluctuations up to half a bit. If transit time fluctuations of $> \frac{1}{2}$ a bit are also to be compensated, this can be effected in that the 8 bit phase intervals are consecutively decoded and fed to the fault safeguarding unit FS. The receiving end clock pulse phase is now determined by a bit phase interval which has been assumed by the receiver to emit information and which is free of error or has correctable errors. In FIG. 3, this alternative is indicated by the arrangement of the analysis unit AW' (broken lines) in combination with the fault safeguarding unit FS.

The clock pulses of the control unit STW which are available only at specific times in the registers and other assemblies provided for this purpose, here, again, automatically set the time windows required for the desired time selection in the transmitter and receiver. By way of further explanation of this time window technology in accordance with FIG. 2, time diagrams for the calling phase are represented in FIG. 4 and for normal operation in FIG. 5.

Figure 4:
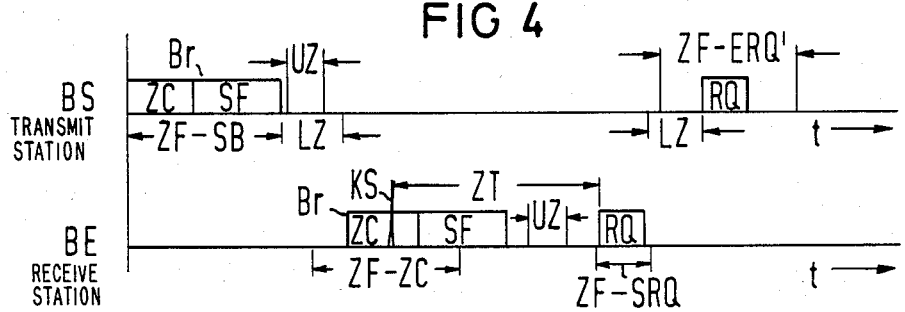
FIG. 4 is a time diagram which illustrates the flow of a connection establishment between two stations of the type illustrated in FIG. 3.

As can be seen from the time diagram BS of FIG. 4, the call burst Br which comprises the time signal ZC and the code sequence SF is transmitted within the time window ZF-SB. Thereupon, in the time interval UZ, a transfer from transmission to reception is effected. At the end of the transit time LZ, as can be seen from the time diagram BE in FIG. 4, the call burst Br arrives in the remote station which, for this purpose, has set a relatively wide time window ZF-ZC to receive the time signal ZC. If the time window correlator ZZ-K, as illustrated in FIG. 3, recognizes the time signal by the occurrence of the time signal correlation peak KS, the time governing the transmission time of the acknowledgment signal RQ starts to run from here onwards. This time interval has been referenced ZT in the diagram BE. Following the reception of the call burst Br and the recognition of the time signal correlation peak KS, during the time UZ the station switches over from reception to transmission and then transmits the acknowledgment signal RQ within the time window ZF-SRQ. Following the transit time LZ, the acknowledgment signal RG arrives in the station transmitting the call burst and, as can be seen from the diagram VS, is received therein in a relatively wide time window ZF-ERQ' for the reception of the acknowledgment signal.

Figure 5:
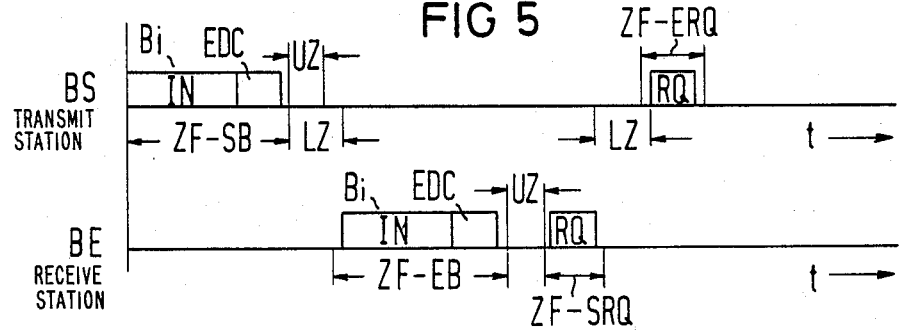
FIG. 5 is a further time diagram which illustrates the operating flow of two stations of the type illustrated in FIG. 3.

As a result of the determinate transmission of the acknowledgment signal at a given interval from the time signal correlation peak KS of the received time signal in the called station, the station transmitting the call burst is able to determine the transit time via the time of reception of the acknowledgment signal and in this manner can set a narrow time window for the acknowledgment signals RQ which are returned from the receiving station in the timing of the information bursts Bi which are now to be transmitted. This fact is represented in FIG. 5. The information burst Bi in each case comprises the information component IN and the fault safeguarding component EDC. As soon as the information burst has been received in the time window ZF-EB at the remote station, as can be seen from the diagram BE in FIG. 3, a transfer from reception to transmission takes place in the time interval UZ and subsequently the acknowledgment signal RQ is transmitted in the time window ZF-SRQ. The acknowledgment signal RQ which arrives in the station transmitting the information burst following the transit time LZ is received in the time window ZF-ERQ which is now narrow.

Figure 6:
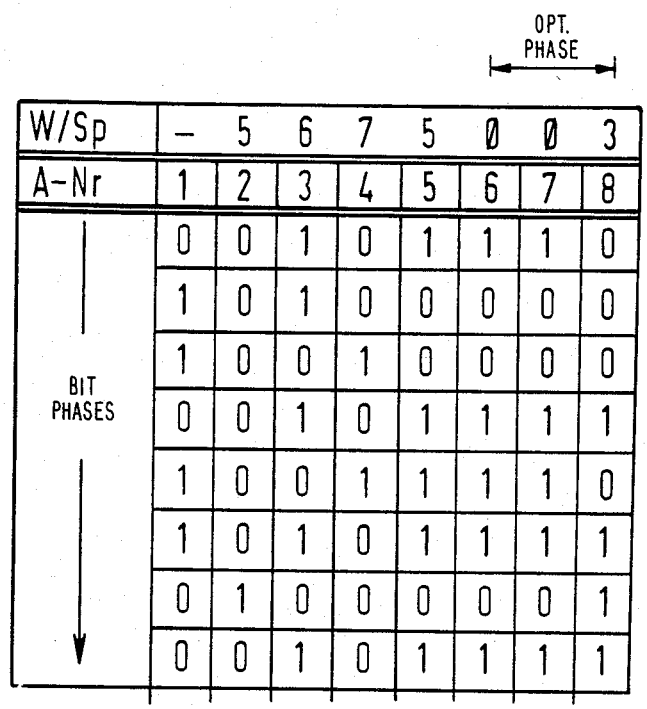
FIG. 6 is a table illustrating in detail the mode of operation of the matrix memory of the station illustrated in FIG. 3.

The table which is represented in FIG. 6 and which explains in detail the mode of operation of the matrix memory MSP shown in FIG. 3 assumes, for reasons of simplicity, that the information burst comprises only 8 bits, each of which are sampled in 8 phases. Thus, in other words, the information burst is stored in 8 consecutive bit phase intervals, the first bit to arrive settling in the uppermost storage position of the table and each other bit settling in an underlying storage position. The 8 bit phases, 1,2,3 . . . 8 are indicated in row A-Nr. Each binary "1" is referenced 1 and each binary "0" is referenced 0. As is readily apparent, 5 bit jumps occur from the transition of a bit phase interval 1 to the bit phase interval 2, whereas 6 bit jumps occur from the transition of the bit phase interval 2 to the bit phase interval 3, etc. The result of the bit jumps from transition-to-transition is indicated in row W/SP. It will be clear that no bit jumps occur in respect of the transition between the bit phase intervals 5 and 6, on the one hand, and between the bit phase intervals 6 and 7, on the other hand, and, therefore, the center of this bit phase range, which is referenced "Opt. Phase" marks the correct receiving end clock pulse which is the subject of the search.

Although we have described our invention by reference to particular illustrative embodiments thereof, many changes and modifications of the invention may become apparent to those skilled in the art without departing from the spirit and scope thereof. We therefore intend to include within the patent warranted hereon all such changes and modifications as may reasonably and properly be included within the scope of our contribution to the art.

We claim:

1. In a process for protecting transmission of digital signals via short waves between a transmitting station and a receiving station, in which the digital signals are encoded and transmitted as bursts, and in which, prior to transmission of a further burst, the receiving station returns an acknowledge signal to the transmitting station, the improvement therein comprising the steps of:

synchronizing the transmitting and receiving stations with highly accurate quartz crystal clocks by transmitting, at the beginning of the transmission process, at least one time signal which comprises an autocorrelation code sequence, receiving and analyzing the time signal with a time signal correlator, and adjusting the receiving station clock with the correlation result;

transmitting and receiving bursts in a pseudo-random frequency jump pattern of frequencies in a predetermined group of frequencies with each jump interval comprising the burst and acknowledgement signal transmission times;

recalculating the code sequence for each burst on the basis of the time of the transmitting station clock and the subscriber number of the receiving station;

decoding each received signal burst and determining if the same is error-free or error-correctable; and applying only an error-free or error-correctable decoded burst to an output device.

2. The improved process of claim 1, for the transmission of items of information limited to a single burst, and further comprising the step of:

prior to the step of transmitting, generating, as a single burst, an encoded information component, an encoded fault safeguarding component and an uncoded time signal component which precedes the information and fault safeguarding components.

3. The improved process of claim 1, for the transmission of an item of information which spans a plurality of bursts, and further comprising the steps of:

generating and transmitting a call burst comprising a time signal and a code sequence representing the selective call, and then an information burst comprising an information component and a fault safeguarding component;

receiving and recognizing the code sequence and returning the acknowledgement signal; and setting a narrow time window in the transmitting station, on the basis of the acknowledgment signal transit time, for receiving subsequent acknowledgment signals in the course of subsequent transmission of information bursts.

4. The improved process of claim 1, and further comprising the steps of:

prior to decoding, storing each incoming bit of an information burst in a matrix memory in respective ones of a plurality of phases;

detecting those phase intervals which have a minimum number of bit change transitions and defining the same as the bit clock pulse phase for the center of the bit phase interval range; and feeding the bit phase interval of the determined bit clock pulse phase to a fault safeguarding unit and transmitting an acknowledgement signal from the receiving station to the transmitting station in response thereto.

5. The improved process of claim 1, and further comprising the steps of:

storing each incoming bit of an information burst in a matrix memory in a respective one of a plurality of phases;

decoding each bit phase interval and feeding the same to a fault safeguarding unit;

detecting a bit phase interval which is at least error-correctable and defining the same as an acceptable clock pulse phase for emission of information.

6. The improved process of claim 1, and further comprising the step of:

pseudo-randomly changing the interval of time between two consecutive transmission times for the transmission of bursts.

* * * * *